(12) United States Patent
Owens et al.

(10) Patent No.: US 11,868,366 B2
(45) Date of Patent: Jan. 9, 2024

(54) SYSTEM ARCHITECTURE FOR RELATING AND LINKING DATA OBJECTS

(71) Applicant: Palantir Technologies Inc., Denver, CO (US)

(72) Inventors: Matthew Owens, New York, NY (US); Andrew Girvin, Menlo Park, CA (US); Alice Venancio Marques Serra, Paris (FR); Daniel Williams, Menlo Park, CA (US); Myles Gurule, New York, NY (US); Harishchandra Ramadas, Palo Alto, CA (US); James Evans, Staten Island, NY (US); Lekan Wang, Arlington, VA (US); Megha Arora, Palo Alto, CA (US); Nelson D'Antonio, Arvada, CO (US); Shannon Barnes, Alexandria, VA (US); Anthony Sherbakov, London (GB)

(73) Assignee: Palantir Technologies Inc., Denver, CO (US)

( * ) Notice: Subject to any disclaimer, the term of this patent is extended or adjusted under 35 U.S.C. 154(b) by 1 day.

(21) Appl. No.: 17/710,605

(22) Filed: Mar. 31, 2022

(65) Prior Publication Data

US 2022/0222270 A1 Jul. 14, 2022

Related U.S. Application Data

(63) Continuation of application No. 16/260,633, filed on Jan. 29, 2019, now Pat. No. 11,294,928.
(Continued)

(51) Int. Cl.
*G06F 16/26* (2019.01)
*G06F 16/28* (2019.01)
*G06F 16/248* (2019.01)

(52) U.S. Cl.
CPC ............ *G06F 16/26* (2019.01); *G06F 16/248* (2019.01); *G06F 16/289* (2019.01)

(58) Field of Classification Search
CPC ....... G06F 16/26; G06F 16/289; G06F 16/248
See application file for complete search history.

(56) References Cited

U.S. PATENT DOCUMENTS 5,303,379 A * 4/1994 Khoyi ...................... G06F 8/76
718/100
5,694,546 A * 12/1997 Reisman ............ G06Q 30/0601
709/227

(Continued)

*Primary Examiner* — Apu M Mofiz
*Assistant Examiner* — Farhad Agharahimi
(74) *Attorney, Agent, or Firm* — Knobbe, Martens, Olson & Bear, LLP (57) ABSTRACT

A system architecture for linking one or more derived objects to existing data objects in a data structure can be organized in a variety of forms. A method for establishing the architecture may include linking first and second data objects. linking first and second data objects. The first and second data objects may be associated with corresponding first and second pluralities of properties. The method may include receiving a first user limitation associated with at least one of the first or second pluralities of properties and receiving a second user limitation associated with at least one of the first or second pluralities of properties. The method can include deriving a conclusion object comprising a third plurality of properties comprising a subset of one or more of the first or second pluralities of properties and linking the conclusion object to the first and second data objects.

20 Claims, 6 Drawing Sheets

Related U.S. Application Data (60) Provisional application No. 62/745,115, filed on Oct. 12, 2018.

(56) References Cited

U.S. PATENT DOCUMENTS

| | | | | |
|---|---|---|---|---|
| 6,057,837 | A * | 5/2000 | Hatakeda | G06F 40/18 715/708 |
| 11,294,928 | B1 | 4/2022 | Owens et al. | |
| 2008/0306989 | A1 * | 12/2008 | Boyce | G06V 20/69 707/999.102 |
| 2017/0177646 | A1 * | 6/2017 | Chen | G06F 16/20 |
| 2018/0190386 | A1 * | 7/2018 | Yoshikawa | G16C 20/80 |

\* cited by examiner

SYSTEM ARCHITECTURE FOR RELATING AND LINKING DATA OBJECTS

CROSS-REFERENCE TO RELATED APPLICATIONS

This application is a continuation application of U.S. application Ser. No. 16/260,633, filed on Jan. 29, 2019, titled "SYSTEM ARCHITECTURE FOR RELATING AND LINKING DATA OBJECTS", which claims the benefit of priority under 35 U.S.C. § 119(e) to U.S. Provisional Application No. 62/745,115, filed on Oct. 12, 2018, titled "SYSTEM ARCHITECTURE FOR RELATING AND LINKING DATA OBJECTS," which are hereby incorporated by reference herein in their entireties for all purposes.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Software architectures can be used to organize information. However, some inadequacies exist in current architectures. Raw data may be obtained and stored in a database. The raw data may be obtained from a scientific experiment, an industrial process, or from some other type of sensors. The data may be disorganized or unclear to a user and/or a computer (e.g., in a machine learning environment). The data may be associated with various data objects, and the data objects may include various properties associated with the object. For example, one data object may include experimental results from a scientific investigation of health responses across various concentrations of a medicament. The data object may be linked to other objects, such as a chart or graph that partially organizes the experimental results. However, this data may be unconnected to other relevant data objects, such as gene profiles associated with the medicament. While a data structure may include a link from the experimental results to the chart, the structure may not link directly to the data object of the gene profiles. Additionally or alternatively, current data structures do not adequately link new data objects to existing data objects based on user input or automatic determinations. Such problems are not restricted to scientific data or experimental results but may arise in any context where linkages among sensory observations and outcomes of those observations may be made.

DETAILED DESCRIPTION

Terms

In order to facilitate an understanding of the systems and methods discussed herein, a number of terms are described below. The terms described below, as well as other terms used herein, should be construed to include the provided descriptions, the ordinary and customary meaning of the terms, and/or any other implied meaning for the respective terms. Thus, the descriptions below do not limit the meaning of these terms, but only provide exemplary descriptions.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid-state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage). However, the hosted storage environment may additionally or alternatively be located on the client computing device.

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Object or Object: A data container for information representing specific things in the world that have a number of definable properties. For example, a data object can represent an entity such as a physical object, a parcel of land or other real property, a market instrument, a policy or contract, or other noun. Each data object may be associated with a unique identifier that uniquely identifies the data object. The object's attributes (e.g. metadata about the object) may be represented in one or more properties. Attributes may include, for example, a geographic location associated with the object, a value associated with the object, a probability associated with the object, an event associated with the object, and so forth.

Application Environment: A broad term that includes, among other things, any computing system or systems, including virtual computing systems, that are configured to execute one or more software applications, computer programs, or other software components. An application environment may be configured to execute software components that are written in one or more particular programming languages and/or are compiled/interpreted/prepared into one or more particular formats or structures. Application environments may also be referred to as "computing environments," "operating environments," or simply "environments." Application environments may be configured in a variety of configurations, examples of which are described in references to the various embodiments of the present disclosure. For example, in some implementations, a software application may itself be an application environment, configured to execute or allow execution of other software applications. Accordingly, in various implementations, one or more of the "software applications" of the present disclosure may also be "application environments."

Overview

Reference will now be made in detail to example embodiments, the examples of which are illustrated in the accompanying drawings. Whenever possible, the same reference numbers will be used throughout the drawings to refer to the same or like parts.

Raw data may be obtained and stored in a database. The raw data may be obtained from any data source, such as sensors associated with a scientific experiment, an industrial process, or any other system or process. The data may be disorganized or unclear to a human user. The data may be associated with or stored in one or more data objects, and the data objects may include various properties associated with each object (or set of objects). For example, one data object may include experimental results from a high-throughput drug screen outlining the efficacy of chemical compounds at various concentrations against disease models. The data object may be linked to other objects, such as a hypothesis object which is then either supported or invalidated through linked analysis objects consisting of logic and visualizations (e.g., chart). Individual researchers may then be able to explore the evidence linked to a hypothesis from disparate experimental efforts and declare a hypothesis as proven inconclusive or disproven. A definitive proof or rebuttal of a hypothesis may trigger a decision object that links concepts together, such as an association of a drug compound as a prospective therapeutic for a disease based upon collected experimental evidence and analysis. Such problems are not restricted to scientific data or experimental results but may be found in any context where linkages among observations and decisions related to the observations may be made collaboratively.

A data structure can allow for the linking of otherwise disconnected data objects and/or their associated properties. The linking can be based on a user selection or it may be made automatically using a software algorithm. To continue the example above, a link can be made between the data object that includes the experimental results of the assay measurement and the data object that includes the gene expression profiles of cell lines with a particular diseases. For example, a user (e.g., a scientist) may carry out an analysis upon the assay results that indicates a connection between the assay results and the gene profiles. The data structure can link the two data objects together. A computer system may be configured to automatically detect a relationship between the two data objects (e.g., the assay measurements and the gene profiles) and link the data objects without user input. The data object may include metadata (e.g., time of experiment) that can be updated and stored in the data structure.

The present disclosure describes various embodiments of a technical system architecture that may overcome one or more of the above-noted technical challenges. According to an embodiment, the system architecture includes the following characteristics. First and second data objects may be linked. The first data object may include a plurality of properties. The second data object can similarly include a plurality of properties. One or more of the second plurality of properties may be based on the first plurality of properties. The architecture can receive a user limitation of a property type associated with the at least one of the plurality of properties associated with the second data object. The property type can be a data range, a data type, or any other feature by which the data are parsed into usable information by the user. The technical architecture can derive a new object that includes a third plurality of properties comprising a subset of one or more of the pluralities of properties based on the user limitation. The architecture can manually or automatically link the new object to the first and second data objects. The new object may be referred to as a derived object.

For example, in reviewing data on a study on the effects of various dosages of medicament on a living tissue, a user may choose to limit the results of a sensor from a scientific experiment related to doses of medicament to include only high dosages (e.g., a range of dosages). Additionally or alternatively, the user could select a type of medicament, a group of treatment specimens, or any other relevant feature of the sensor data. Based on the selection, the user may be better able to identify a trend or pattern in the results. The user may choose to have the data visualized in an existing or new object, such as a graph, a chart, a plot, or any other type of visualization.

As described in further detail below, various alternative implementations of the present disclosure may include additional or fewer characteristics from those described above.

Exemplary Linking Architectures

To provide a framework for the following discussion of specific systems and methods described herein, an example system setup 100 will now be described with reference to FIGS. 1-5. This description is provided for the purpose of providing an example and is not intended to limit the techniques to the example system architecture.

Figure 1:
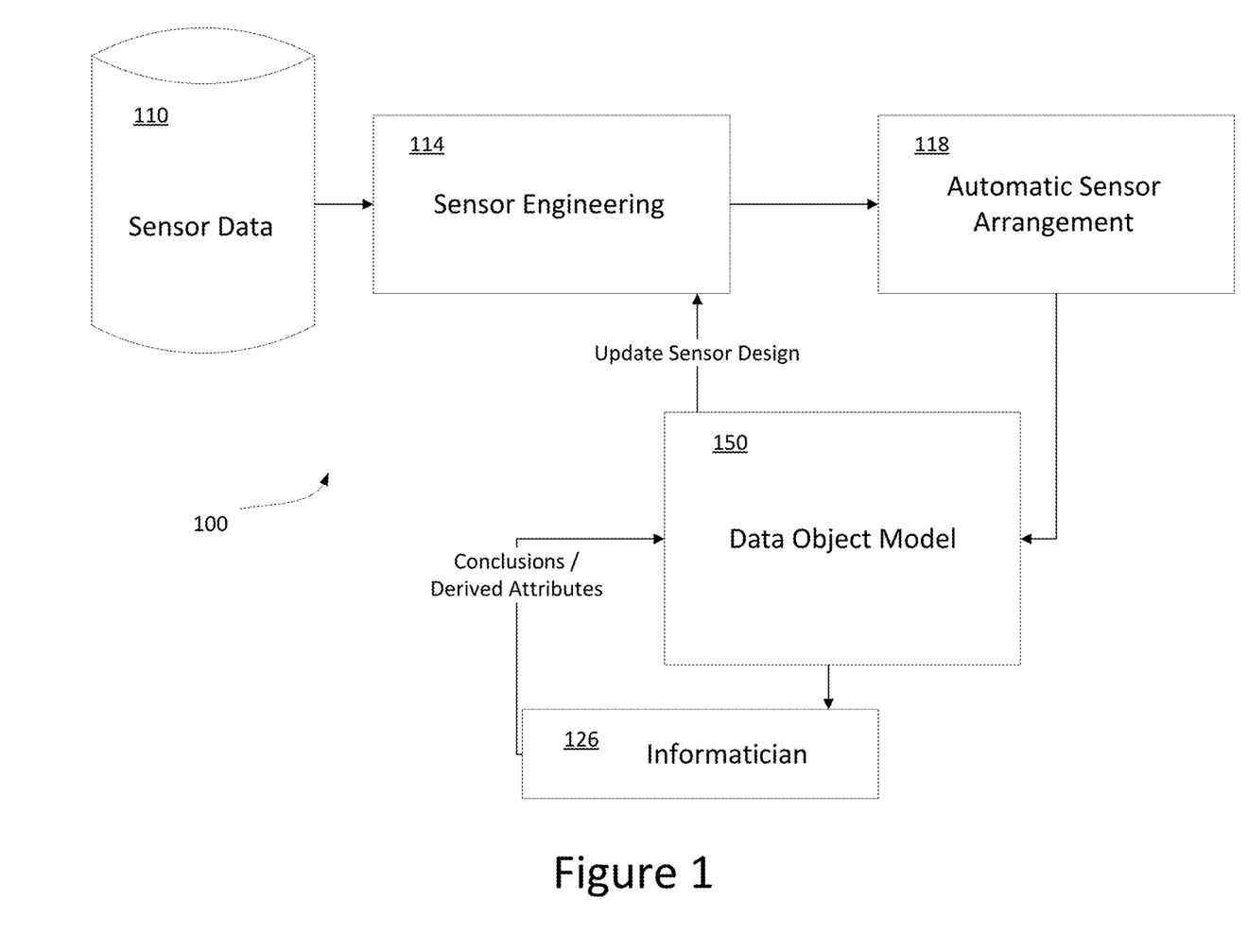
FIG. 1 is a flow chart showing an example system setup including a data object model.

FIG. 1 is a flow diagram showing an example system setup 100 including a data object model 150. As shown in FIG. 1, the system setup 100 can include sensor data 110, sensor engineering 114, automatic sensor arrangement 118, a data object model 150, and input from a user such as a researcher, manager or informatician 126. The sensor data 110 can include any measurements or results taken from one or more sensors. The sensors may include any type of sensor, such as thermal readings, optical readings, weight or mass measurements, concentration measurements, reaction results (e.g., chemical reactions with reagents, medical investigation results, etc.), photographic imagery, motion detection, or any other type of measurable or sensory data. The sensor data 110 may come from a single sensor or may include data from a variety of sensors. The sensor data 110 can be stored as a data set in a computer data store (e.g., long-term storage).

The sensor data 110 may be accessed by a user to inform a design of further sensory data collection. The sensor engineering 114, which may include a user and/or a sensor arrangement computing system, may generate setup parameters of a scientific experiment, a user collection of personal information, an industrial measurement project, or any other design of a group of sensors. For example, a biologist may use the data from the sensor data 110 and, perhaps in conjunction with an experiment engineer, determine a sensor configuration and other experiment settings, to collect data according to certain configurations. For example, an experiment configuration may include a time of day, month, or year; the duration; the rate of collection; the arrangement of the data; the storage technique; and/or any other feature of the project, each of the configuration settings being determined by a human and/or a computer.

The system setup 100 can include automatic sensor arrangement 118, which may comprise a test or experiment area that includes multiple sensors and/or other devices. In some embodiments, the components of the experiment area are calibrated based on the determined configuration settings, which may be accomplished by robotic (automated) actions of a non-human and/or by human actions. Once the sensors have been arranged and the settings of them have been identified, a computer may be used to automate the collection of the data. The system can be configured to automatically continue the data collection until it receives a stopping command by a user or until a predetermined outcome is reached. For example, in an experiment on the effects of a concentration of certain molecules in the atmosphere on weather patterns, the sensors could be configured to continue to measure the concentrations for a long enough period to provide statistically significant data to an informatician.

The automated data collection can be configured to store the data in a data object model 150. The data object model 150 can include various data items with a system architecture, such as those described herein and the example objects described below with respect to FIGS. 2-3. The data object model 150 can store and link data in a manageable and intuitive fashion for a user, such as described below in more detail. The data collected from the automatic sensor arrangement 118 may be stored in the data object model 150 and used to inform the setup of the sensor engineering 114, such as a future experiment. For example, the data object model 150 may include results or conclusions that will benefit or even necessitate an update or modification to the sensor engineering 114 of the sensor arrangement. With regard to the example above of tracking concentration of certain molecules, once the sensors have provided the finished data into the data object model 150, a user (e.g., scientist, experiment designer/engineer, statistician) may update the experimental setup to have the sensors track an additional variable (e.g., temperature of the air, a concentration of a separate molecule, a clarity in the air) as the experiment continues to run. Thus, the data collected from the sensors and input into the data object model 150 may provide feedback for updating and improving the experimental setup. While the system setup 100 can be configured to allow a user to update the sensor engineering 114, in some embodiments, the sensor engineering 114 may be updated automatically by a computer. For example, a machine learning algorithm may derive certain conclusions from the data object model 150 and, based on those conclusions, update the experimental setup of the sensors.

The data object model 150 may be modified from time to time. The modification may be done manually or automatically. For example, an informatician 126 may review the data object model 150 and determine conclusions (e.g., new or derived data objects), new or additional (e.g., derived) attributes of existing or new data objects, and/or new connections for inclusion in the data object model 150. Additionally or alternatively, the informatician 126 can modify an arrangement of one or more connections and/or data objects within the data object model 150. For example, the informatician 126 may make a conclusion regarding certain of the data stored in the data object model (e.g., corresponding to an experiment and reference data regarding certain of the test objects) and add a link between the data objects in the data object model, either by adding a new data object that links the data objects (and may have an object type indicating that it is a decision or observation type of object) and/or by associating the data objects with the conclusion. Advantageously, other users accessing the data object model may then access these new connections between data objects and use them in their research, experiments, etc., in developing even further conclusions or results. For example, a user may notice that an experiment on tracking the concentration of certain molecules in the atmosphere is lacking an important conclusion. The user (e.g., scientist, engineer, statistician, etc.) may recognize a connection from the experiment to other experimental results in the user's own field of expertise, such as botany. The botanist may, for example, notice a trend in the experimental results on molecule concentration in the air and a parallel result of that concentration on the growth of certain plants. The botanist may be able to supply the data object model 150 with a new derived object or conclusion object that links the experimental data to the botanist's data. Thus, the data object model 150 can grow to include connections among data objects that may not be obviously tied to objects containing properties (e.g., data) directly resulting from sensors in the system setup 100.

In some embodiments, a user may remove a link between or among data objects. The changes made by the informatician 126 to the data object model 150 may appear instantaneous or nearly instantaneous for other users of the system setup 100. Users such as scientists (e.g., biologists, computer scientists, psychologists, etc.), system managers, mathematicians (e.g., statisticians, theorists), industrial experts, sensor experts, or other experts may have access to the data object model 150 and may be able to provide the same functionality in addition to or alternative to the informatician 126 described herein.

The data object model 150 may be stored in a data structure (e.g., a database) accessible by a network, such as over the Internet. The data object model 150 can be stored such that the data may be viewed in a local or proprietary display software, such as an enterprise data platform. In certain embodiments, access is limited only to an internal network (e.g., an intranet) so that the data objects and/or the properties of the objects remain confidential within the network. Thus, the system setup 100 may be configured to prevent unauthorized access to the data object model 150 and/or other elements of the system setup 100. Metadata associated with the data objects and/or the associated properties may be made public, limited public (e.g., to within members the network), limited access based on credentials, or fully secure (e.g., only accessible to a system administrator), depending on the circumstances. The metadata may include a time of creation, information related to the author of the new object/properties (e.g., name, credentials, identifying information, etc.), a location (e.g., MAC address) of an author, history of edits or additions to the data object model 150, etc.

Figure 2:
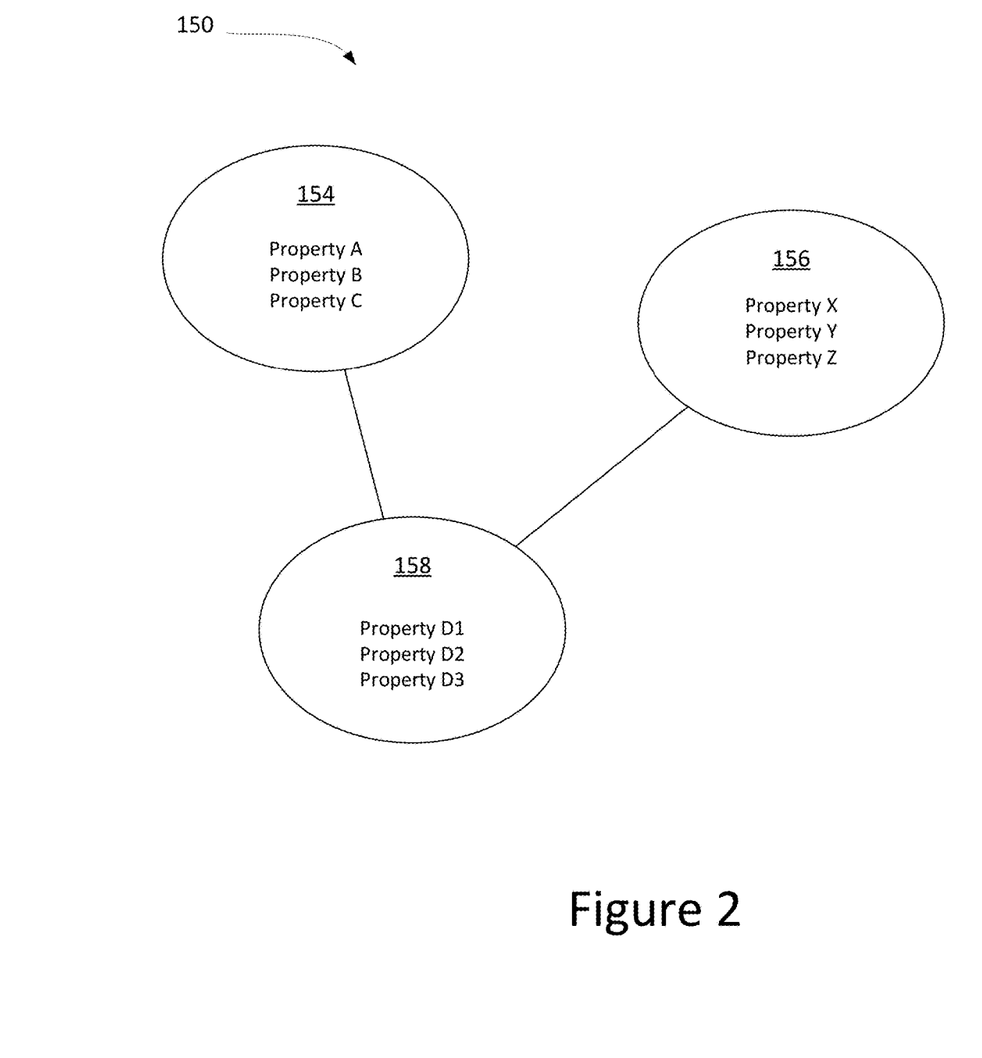
FIG. 2 shows a schematic of an example data object model.

FIG. 2 shows a schematic of an example data object model 150. The data object model 150 can include a first data object 154 and a second data object 156. The first data object 154 may be associated with Properties A, B, and C. The second data object 156 may be associated with other properties, such as Properties X, Y, and Z. An informatician (e.g., the informatician 126) or other entity or user may create a derived data object 158 (e.g., a conclusion object or a "decision" object). The derived data object 158 can include properties such as Properties D1, D2, and D3. The Properties D1, D2, and D3 may include original properties and/or derived properties. Original properties may include properties that exist independent of linked data objects. Derived properties may include properties that are at least partially dependent on properties from linked data objects. For example, if Property D1 is at least partially based on Property A and Property X, then Property D1 would be a derived property of Properties A and X.

Derived properties can be derived from other properties within the derived data object 158 itself. For example, Property D2 may be at least partially based on Property B, Property Y, and Property D1. Other configurations are possible. The informatician may choose to add the links between the derived data object 158 and the first data object 154 and between the derived data object 158 and the second data object 156. One or more of the data objects 154, 156, 158 may have greater or fewer properties than shown. A derived property may be based on other properties through a mathematical relationship, a scientific relationship, a logical relationship, a geographical relationship, or any other type of relationship. In some configurations, derived objects such as the derived data object 158 may include properties that are derived properties based on only original properties to the same data object.

Figure 3:
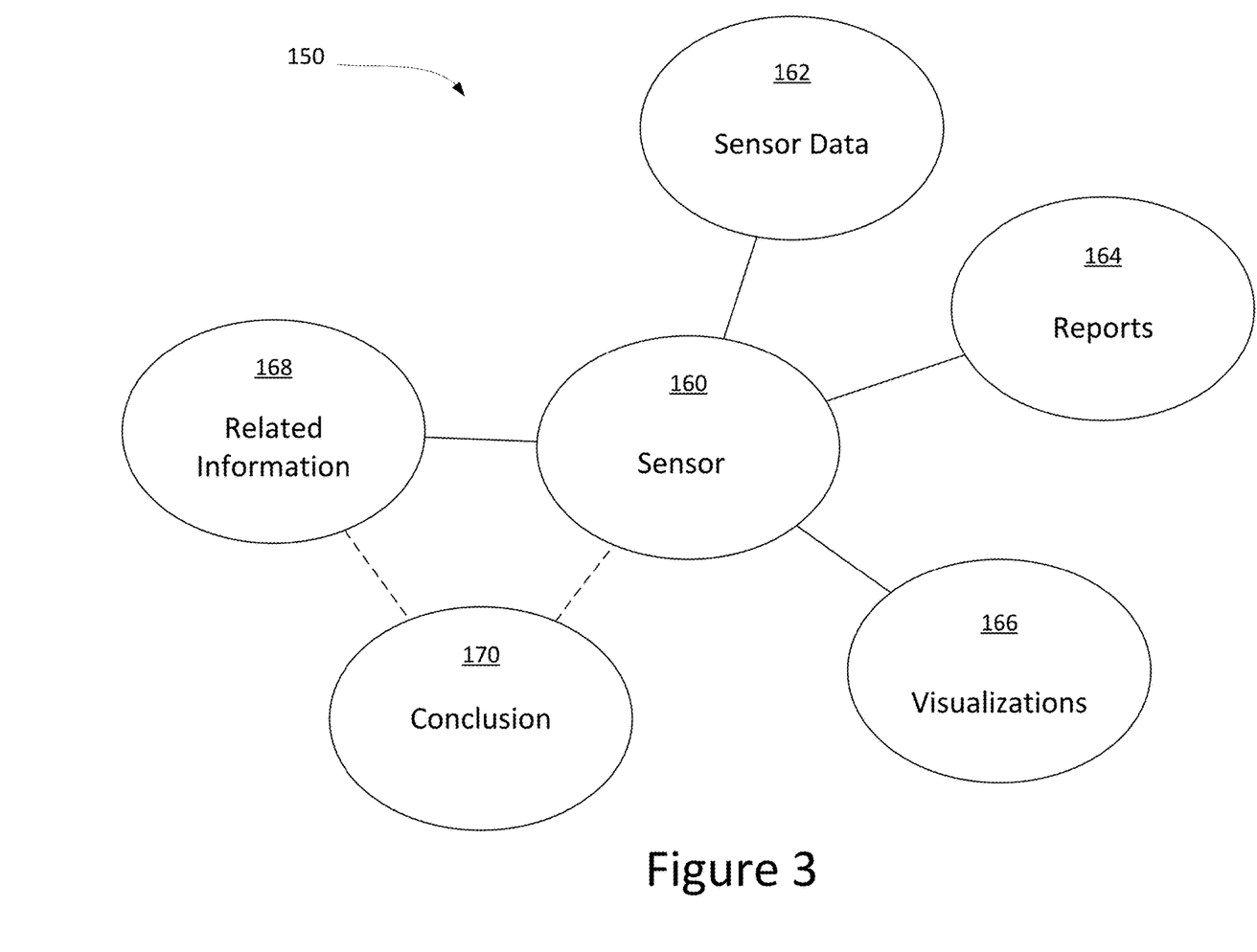
FIG. 3 shows another example of a data object model.

FIG. 3 shows another example of a data object model 150. As shown, a sensor object 160 can have original connections (shown in solid lines) to a sensor data object 162, a reports object 164, a visualizations object 166, and a related information object 168. The sensor object 160 may include properties associated with a particular sensor or a group of sensors, such as those described herein. In some embodiments, the sensor object 160 includes experimental data resulting from execution of a scientific process resulting in output of thousands, millions, or more output data points that may themselves be part of the sensor data object or other separate data objects. In some embodiments, the sensor object 160 may include an industrial sensor arrangement, a medical investigation, or other sensor arrangement. For example, the sensor object 160 may include raw data captured by the corresponding one or more associated sensors. However, in some embodiments, raw data of the sensor is stored in separate sensor data objects 162. The sensor object 160 may additionally or alternatively include information related to the sensor itself, such as functionality of the sensor, limits of the sensor, features or aspects of the sensor, or other details related to the sensor. As noted, the sensor data object 162 may include raw data captured by the sensor object 160. Additionally or alternatively, the sensor data object 162 may include properties containing additional data related to the sensor. For example, the sensor data object 162 may include relevant data about the subject that the sensor object 160 is capturing.

The reports object 164 may include some derived attributes or properties (e.g., interim conclusions) related to the sensor object 160 and/or the sensor data object 162. In some embodiments, the sensor data object 162 and the reports object 164 are linked together (not shown in FIG. 3). However, in some embodiments, the sensor data object 162 and the reports object 164 are linked to each other via the sensor object 160. The reports object 164 may include analysis of the sensor and/or the sensor data. The visualizations object 166 may include visual representations of properties associated with the sensor object 160 and/or the sensor data object 162. For example, the visualizations object 166 may include a, histogram, bar graph, data plot, line graph, table, photograph, pie chart, flowchart, video, or other visual indicator of the subject matter. The visualizations object 166 can include one or more such representations in the same object.

The related information object 168 may include other data associated with the sensor object 160. For example, the related information object 168 can include information related to a subject of the sensor. In some embodiments, the related information object 168 includes information gathered from another sensor arrangement (e.g., same sensor arrangement at a previous time, a separate scientific experiment, a separate industrial sensor setup, etc.). For example, in a sensor arrangement relating to the efficacy of a particular concentration of drug on an organism, the related information object 168 may include additional details on the organism and/or the drug.

A user, such as a scientist or informatician, may be able to identify a connection or conclusion about the properties in the related information object 168 and the sensor object 160. For example, the user may determine that a trend in the concentration of the medicament has a predictable effect on the organism. This new connection or conclusion may be recorded in a new data object. The new data object may be the conclusion object 170. The dotted lines connecting the related information object 168 with the conclusion object 170 and the sensor object 160 with the conclusion object 170 indicate that the conclusion object 170 was added by a user recently. The conclusion object 170, once added, may become a permanent or temporary part of the data object model 150. The conclusion object 170 may become accessible by other users or by automatic processes of an associated computer or computer network.

Figure 4:
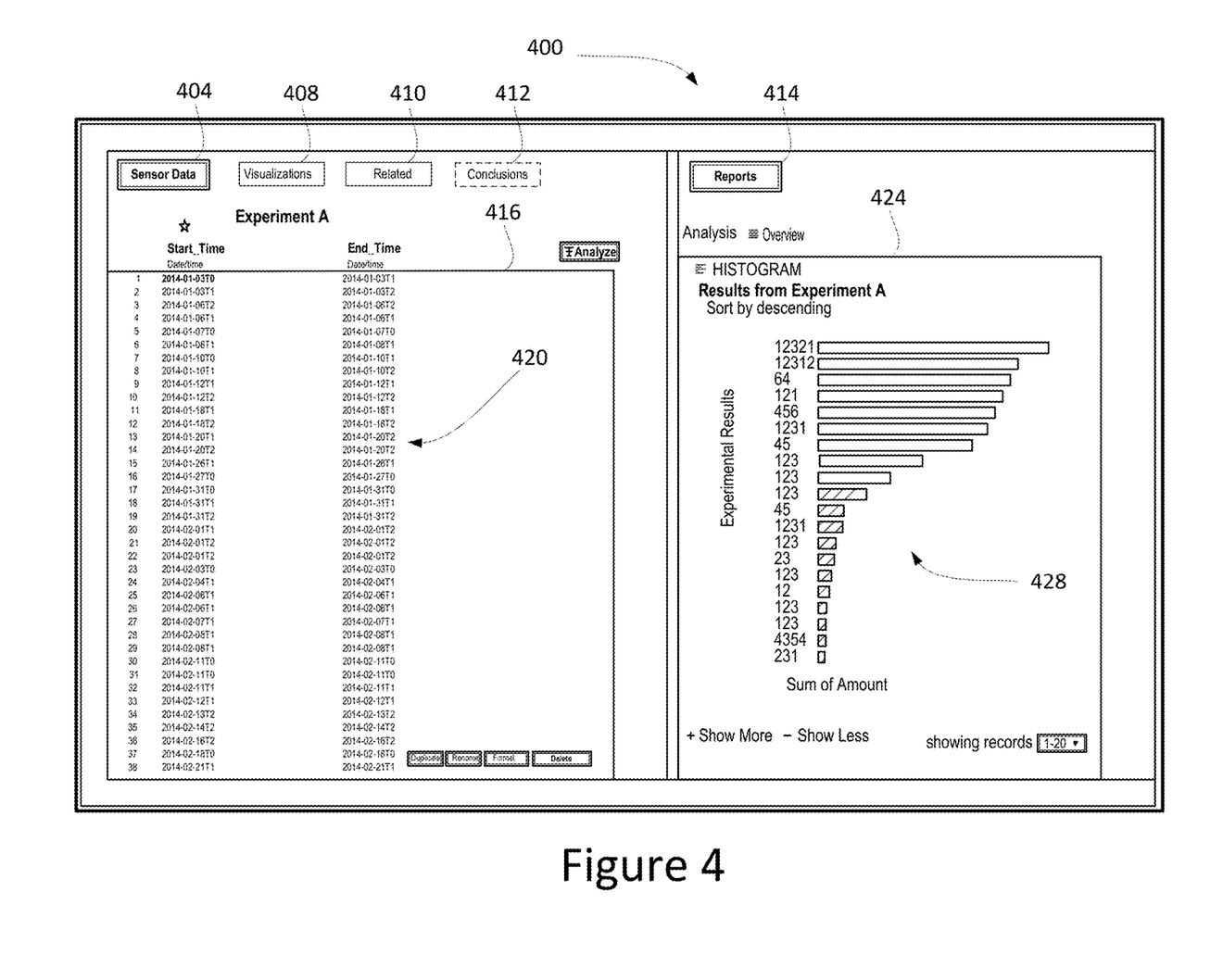
FIG. 4 shows an example user interface that may allow a user to interact with a data object model, such as the data object model.

FIG. 4 shows an example user interface 400 that may allow a user to interact with a data object model, such as the data object model 150. The user interface 400 may include one or more object selectors, such as those associated with an underlying data object model. As shown, the user interface 400 includes selected object control 404, data object controls 408, 410, and a derived object control 412. Each object control may be selected by a user to display one or more of the corresponding properties. Original and/or derived properties may be displayed for each object. The user interface 400 may indicate which object is currently selected. For example, the user interface 400 shows that two objects are selected (the selected object controls 404, 414). While as shown in FIG. 4, multiple objects (e.g., the "Sensor Data" and the "Reports" objects) may be shown simultaneously, in some embodiments a single object may be displayed at a time. Other configurations are possible.

The object associated with the selected object control 404 (e.g., "Sensor Data" object) may include object properties 416. As shown, the Sensor Data object includes sensor results 420 as part of the object properties 416. The sensor results 420 may include raw data captured by a corresponding sensor or group of sensors. Other properties may be included in the display of the Sensor Data object, such as analysis selectors or other data manipulation selectors shown. However, many other types of object properties may be included.

The object associated with the selected object selector 414 (e.g., "Reports" object) may include an analysis of the object properties 416 of the "Sensor Data" object (e.g., an analysis of the sensor results 420). One or more object properties 424 may be included in the display, such as a visualization property 428 (e.g., a histogram) depicting ranges of results of a derived property (e.g., Results from Experiment A). As shown, the visualization property 428 may include a histogram, but other types of analyses and/or visualizations may be included. The "Reports" object may include additional and/or alternative object properties 424.

Figure 5:
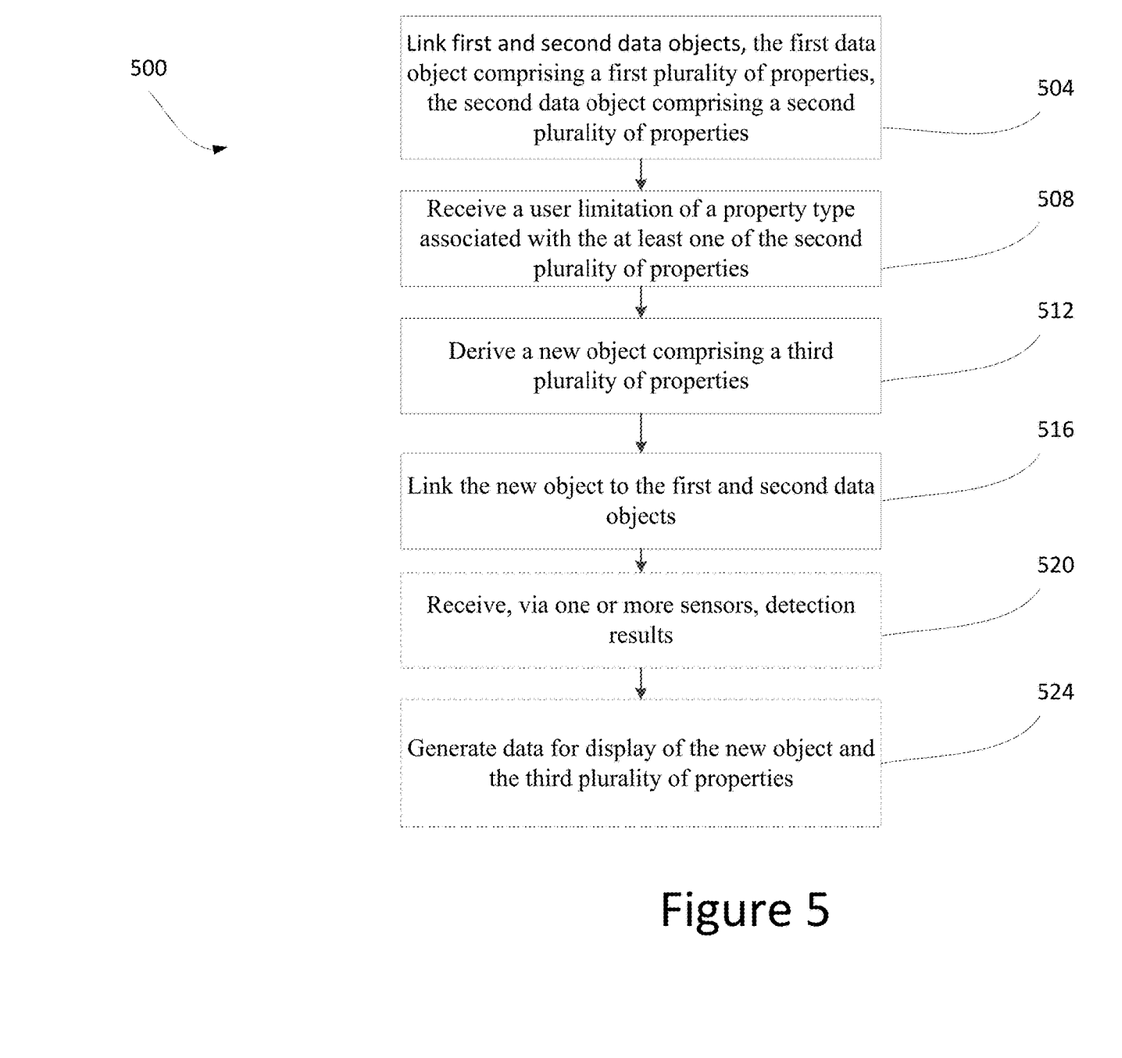
FIG. 5 shows an example method that may be implemented on a computer.

FIG. 5 shows an example method 500 that may be implemented on a computer. At block 504 the method 500 includes linking a first and second data objects. The first data object may include a first plurality of properties and the second data object may include a second plurality of properties. At least one of the second plurality of properties may be based on the first plurality of properties. The first plurality of properties may include results from an investigative experiment, an industrial sensor arrangement, a medical investigation, or other sensor arrangement. The second data object can include a chart, graph, diagram, plot, map, table, or any other property described herein.

At block 508, the method 500 may include receiving, by a computer, a user limitation of a property type associated with the at least one of the second plurality of properties. In some embodiments, the method 500 can further include receiving, by a second computer, a second user limitation of a property type associated with the second plurality of properties. The property type associated with the first or second plurality of properties can include a data range, a data type, a time window, or some other property type.

At block 512, the method 500 may include deriving, based on the user limitation, a new object that includes a third plurality of properties. In some embodiments, the method 500 can include automatically determining the second plurality of properties of the second data object. The third plurality of properties can include a subset of one or more of the first and second pluralities of properties.

At block 516, the method 500 can include linking the new object to the first and second data objects. In some embodiments, a second new object may be created that replaces the new object. However, in certain configurations the second new object may be linked to the new object.

In some embodiments, at block 520, the method 500 can include receiving, via one or more sensors, detection results. The first plurality of properties comprising the detection results. In some designs, the method may include generating data for display of the new object and the third plurality of properties.

Example Embodiments

Some example embodiments are provided below for illustration purposes. Additional or alternative examples are possible.

In a first example ("example 1"), a computer-implement method for linking one or more derived objects to existing data objects in a data structure comprises linking first and second data objects, the first data object comprising a first plurality of properties, the second data object comprising a second plurality of properties, wherein at least one of the second plurality of properties is based on the first plurality of properties; receiving, by a computer, a user limitation of a property type associated with the at least one of the second plurality of properties; based on the user limitation, deriving a new object comprising a third plurality of properties comprising a subset of one or more of the first and second pluralities of properties; and linking the new object to the first and second data objects.

In a second example, the method of example 1, further comprising receiving, via one or more sensors, detection results, the first plurality of properties comprising the detection results.

In a third example, the method of any of examples 1-2, further comprising generating data for display of the new object and the third plurality of properties.

In a fourth example, the method of any of examples 1-3, wherein the first plurality of properties comprises results from an investigative experiment.

In a fifth example, the method of any of examples 1-4, wherein the property type comprises a data range, a data type, or both.

In a sixth example, the method of any of examples 1-5, wherein the second data object comprises a chart, graph, diagram, plot, map, or table.

In a seventh example, the method of any of examples 1-6, further comprising automatically determining the second plurality of properties of the second data object.

In an eighth example, the method of any of examples 1-7, further comprising receiving, by a second computer, a second user limitation of a second property type associated with the second plurality of properties.

In a ninth example, the method of example 8, further comprising deriving, based on the second user limitation, a second new object and linking the second new object to the first and second objects.

In a tenth example, the method of example 9, further comprising replacing the new object with the second new object.

In a eleventh example, the method of example 9, further comprising linking the second new object to the new object.

In a twelfth example ("example 12"), a computing system including a data object architecture for linking and relating data objects comprises a computer readable storage medium having program instructions embodied therewith; and one or more processors configured to execute the program instructions to cause the computing system to link first and second data objects, the first data object comprising a first plurality of properties, the second data object comprising a second plurality of properties, wherein at least one of the second plurality of properties is based on the first plurality of properties; receive a user limitation of a property type associated with the at least one of the second plurality of properties; based on the user limitation, derive a new object comprising a third plurality of properties comprising a subset of one or more of the first and second pluralities of properties; and link the new object to the first and second data objects.

In a thirteenth example, the system of example 12, wherein the one or more processors are further configured to execute the program instructions to cause the system to receive, via one or more sensors, detection results, the first plurality of properties comprising the detection results.

In a fourteenth example, the system of any of examples 12-13, wherein the one or more processors are further configured to execute the program instructions to cause the system to generate data for display of the new object and the third plurality of properties.

In a fifteenth example, the system of any of examples 12-14, wherein the first plurality of properties comprises results from an investigative experiment.

In a sixteenth example, the system of any of examples 12-15, wherein the one or more processors are further configured to execute the program instructions to cause the system to automatically determine the second plurality of properties of the second data object.

In a seventeenth example, the system of any of examples 12-17, wherein the one or more processors are further configured to execute the program instructions to cause the system to receive, by a second computer, a second user limitation of a second property type associated with the second plurality of properties.

In a eighteenth example, the system of example 17, wherein the one or more processors are further configured to execute the program instructions to cause the system to derive, based on the second user limitation, a second new object and linking the second new object to the first and second objects.

In a nineteenth example, the system of example 18, wherein the one or more processors are further configured to execute the program instructions to cause the system to replace the new object with the second new object.

In a twentieth example, the system of example 18, wherein the one or more processors are further configured to execute the program instructions to cause the system to link the second new object to the new object.

Additional Implementation Details

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
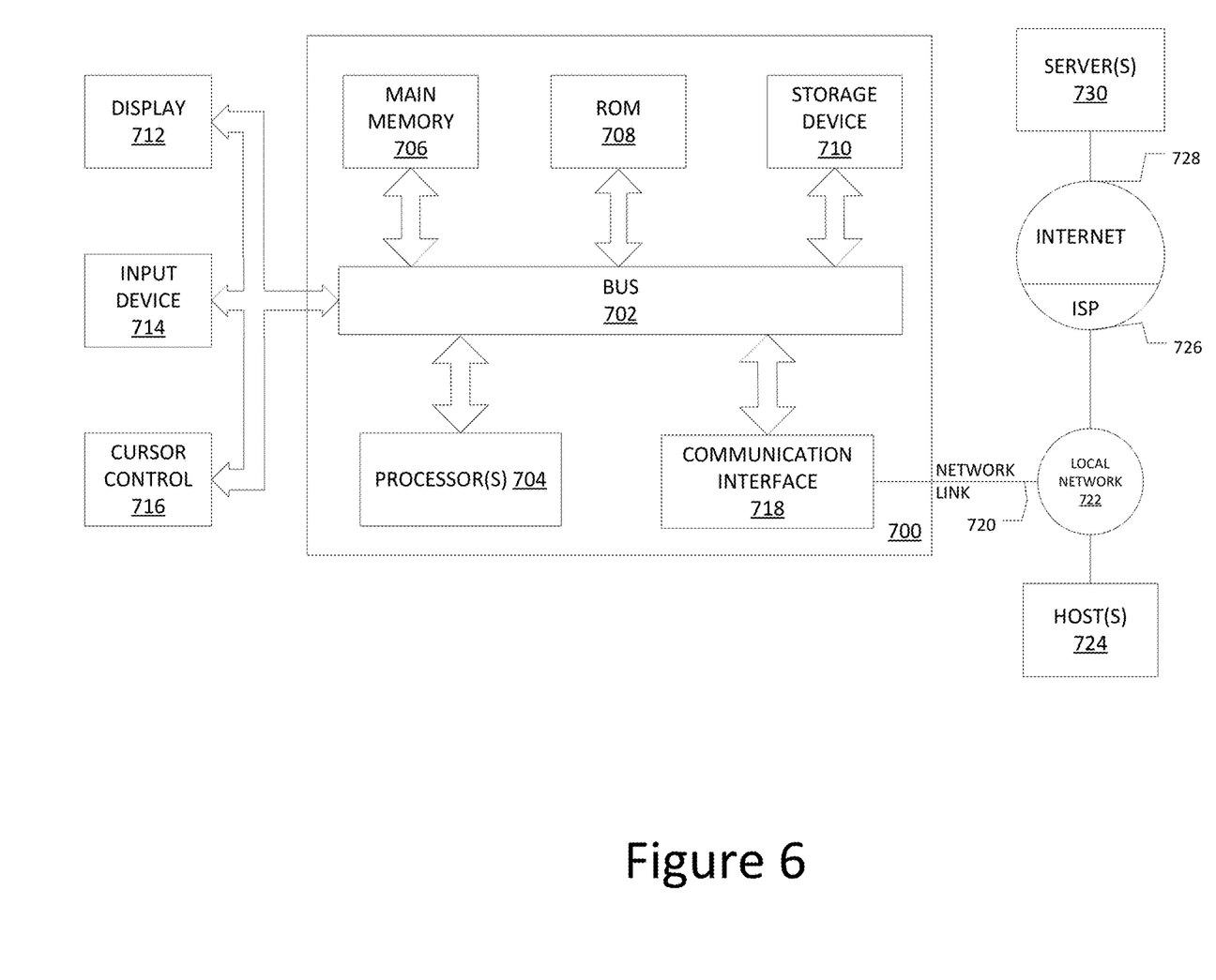
FIG. 6 is a block diagram that illustrates a computer system upon which various embodiments may be implemented.

For example, FIG. 6 is a block diagram that illustrates a computer system 700 upon which various embodiments may be implemented. Computer system 700 includes a bus 702 or other communication mechanism for communicating information, and a hardware processor, or multiple processors, 704 coupled with bus 702 for processing information. Hardware processor(s) 704 may be, for example, one or more general purpose microprocessors.

Computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

Computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 700 may include a user interface module to implement a GUI that may be stored in a mass storage device as computer executable program instructions that are executed by the computing device(s). Computer system 700 may further, as described below, implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more computer readable program instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

Various forms of computer readable storage media may be involved in carrying one or more sequences of one or more computer readable program instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implement method for linking one or more derived objects to existing data objects in a data structure, the method comprising:
    linking first and second data objects associated with corresponding first and second pluralities of properties;
    receiving, by a first computer, a first user limitation associated with the second plurality of properties;
    receiving, by a second computer, a second user limitation associated with of the second plurality of properties, wherein the second user limitation comprises a property type;
    based on the first user limitation and on the property type, automatically deriving a conclusion object comprising a third plurality of properties comprising a subset of one or more of the first or second pluralities of properties; and
    linking the conclusion object to the first and second data objects.

2. The method of claim 1, further comprising receiving, via one or more sensors, detection results, the first plurality of properties comprising the detection results.

3. The method of claim 1, further comprising generating data for display of the conclusion object and the third plurality of properties.

4. The method of claim 1, wherein the first plurality of properties comprises results from an investigative experiment.

5. The method of claim 1, wherein the first user limitation comprises a data range, a data type, or both.

6. The method of claim 1, wherein the second data object comprises a chart, graph, diagram, plot, map, or table.

7. The method of claim 1, further comprising automatically determining the second plurality of properties of the second data object.

8. The method of claim 1, further comprising receiving, by the first or second computer, a third user limitation associated with the third plurality of properties.

9. The method of claim 1, further comprising deriving, based on the second user limitation, a second conclusion object and linking the second conclusion object to the first and second objects.

10. The method of claim 9, further comprising replacing the conclusion object with the second conclusion object.

11. The method of claim 9, further comprising linking the second conclusion object to the conclusion object.

12. A computing system including a data object architecture for linking and relating data objects, the computing system comprising:
    a computer readable storage medium having program instructions embodied therewith; and
    one or more processors configured to execute the program instructions to cause the computing system to:
        link first and second data objects associated with corresponding first and second pluralities of properties;
        receive, by a first computer, a first user limitation associated with the second plurality of properties;
        receive, by a second computer, a second user limitation associated with the second plurality of properties, wherein the second user limitation comprises a property type;
        based on the first user limitation and on the property type, automatically derive a conclusion object comprising a third plurality of properties comprising a subset of one or more of the first or second pluralities of properties; and
        link the conclusion object to the first and second data objects.

13. The computing system of claim 12, wherein the one or more processors are further configured to execute the program instructions to cause the system to receive, via one or more sensors, detection results, the first plurality of properties comprising the detection results.

14. The computing system of claim 12, wherein the one or more processors are further configured to execute the program instructions to cause the system to generate data for display of the conclusion object and the third plurality of properties.

15. The computing system of claim 12, wherein the first or second pluralities of properties comprises results from an investigative experiment.

16. The computing system of claim 12, wherein the one or more processors are further configured to execute the program instructions to cause the system to automatically determine the second plurality of properties.

17. The computing system of claim 12, wherein the one or more processors are further configured to execute the program instructions to cause the system to receive, by a second computer, a third user limitation associated with the third plurality of properties.

18. The computing system of claim 12, wherein the one or more processors are further configured to execute the program instructions to cause the system to derive, based on the first or second user limitation, a second conclusion object and linking the conclusion new object to the first and second objects.

19. The computing system of claim 18, wherein the one or more processors are further configured to execute the program instructions to cause the system to replace the conclusion object with the second conclusion object.

20. The computing system of claim 18, wherein the one or more processors are further configured to execute the program instructions to cause the system to link the second conclusion object to the conclusion object.

\* \* \* \* \*

UNITED STATES PATENT AND TRADEMARK OFFICE
CERTIFICATE OF CORRECTION

PATENT NO. : 11,868,366 B2
APPLICATION NO. : 17/710605
DATED : January 9, 2024
INVENTOR(S) : Owens et al.

It is certified that error appears in the above-identified patent and that said Letters Patent is hereby corrected as shown below:

In the Claims

Column 17, Line 39, Claim 1, after "associated with" delete "of".

Signed and Sealed this
Nineteenth Day of March, 2024

Katherine Kelly Vidal
*Director of the United States Patent and Trademark Office*